(12) United States Patent
Meeyakhan Rawther

(10) Patent No.: US 12,621,402 B2
(45) Date of Patent: May 5, 2026

(54) METHOD AND DEVICE FOR PERFORMING COLOR TWIST FOR IMAGES

(71) Applicant: Advanced Micro Devices, Inc., Santa Clara, CA (US)

(72) Inventor: Rajy Meeyakhan Rawther, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 721 days.

(21) Appl. No.: 17/957,662

(22) Filed: Sep. 30, 2022

(65) Prior Publication Data

US 2024/0114105 A1 Apr. 4, 2024

(51) Int. Cl.
*H04N 1/60* (2006.01)
(52) U.S. Cl.
CPC ......... *H04N 1/6027* (2013.01); *H04N 1/6005* (2013.01)
(58) Field of Classification Search
CPC ...... H04N 1/6027; H04N 1/6005; H04N 1/60; G06T 11/001
See application file for complete search history.

(56) References Cited

U.S. PATENT DOCUMENTS

| | | | | |
|---|---|---|---|---|
| 2003/0202105 A1* | 10/2003 | Gaubatz | ................... | H04N 1/62 348/207.99 |
| 2023/0245494 A1* | 8/2023 | Nadir | ........................ | G06T 5/94 382/103 |

* cited by examiner

*Primary Examiner* — Christopher Wait
(74) *Attorney, Agent, or Firm* — Volpe Koenig

(57) ABSTRACT

A processing device and method for executing a color twist operation are provided. The processing device comprises memory and a processor configured to convert values of pixels of a frame from a first color domain to a hue, saturation and value (HSV) color domain, adjust hue values and saturation values of the pixels, store the adjusted hue and saturation values in a portion of the memory local to the processor and convert the frame from the HSV color domain to the first color domain using the adjusted hue and saturation values stored in local memory. The adjusted hue and saturation values are generated from pre-adjusted values, which are generated from masked vector values.

21 Claims, 5 Drawing Sheets

300

302 — For each frame, execute a single pass

304 — Convert frame from first color domain to HSV color domain by generating pre-adjusted values from masked vector values 306 — Store pre-adjusted values in local memory 308 — Adjust hue value and saturation value 310 — Store adjusted values in local memory 312 — Convert frame from HSV color domain to first color domain 314 — Output frame

METHOD AND DEVICE FOR PERFORMING COLOR TWIST FOR IMAGES

BACKGROUND

Machine learning (e.g., deep learning) is widely used in a variety of technologies (e.g., image classification) to make predictions or decisions to perform a particular task (e.g., whether an image includes a certain object). A convolutional neural network (CNN) is a class of deep learning algorithms widely used in machine learning applications. These networks typically include multiple layers. At each layer, a set of filters is applied to the output of previous layer, and the outputs of each layer are known as activations or feature maps. The first and last layers in a network are known as the input and output layers, respectively, and the layers in between the first and last layers are typically known as hidden layers.

Machine learning models in supervised learning are trained in order to make predictions or decisions to perform a particular task (e.g., whether an image includes a certain object). During training, a model is exposed to different data. At each layer, the model transforms the data and receives feedback regarding the accuracy of its operations. During an inference stage, the trained model is used to infer or predict outputs on testing samples (e.g., input tensors).

BRIEF DESCRIPTION OF THE DRAWINGS

A more detailed understanding can be had from the following description, given by way of example in conjunction with the accompanying drawings wherein.

DETAILED DESCRIPTION

Figure 1:
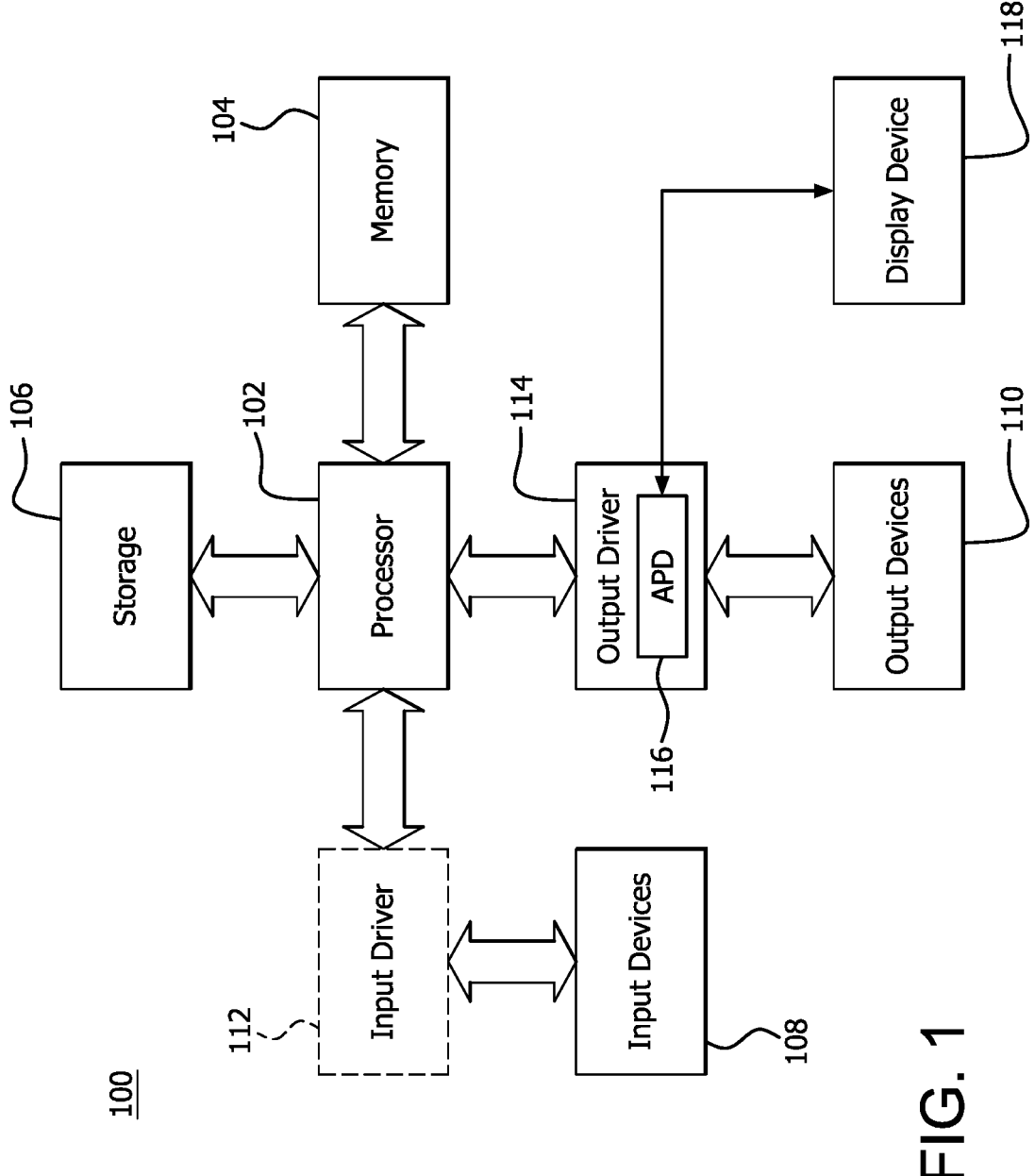
FIG. 1 is a block diagram of an example device in which one or more features of the disclosure can be implemented.

Color twist (also known as color jitter) is a technique which transforms the hue, saturation and brightness of an image. Color twist adjusts the hue, saturation, brightness, and contrast values of an image according to factors selected by a user. After color twist is performed, the hue, saturation and brightness values (e.g., pixel values) of the image are different (e.g., in a different color domain) from the values before color twist is performed.

Color twist is often used to facilitate machine learning tasks, such as image classification, object detection and prediction. However, because the color twist transform results in the image having different color values (i.e., hue, saturation and brightness values), an object in an image can be incorrectly detected (e.g., detecting a cat as a dog) due to the changes in the color values of the object. To prevent incorrect detection due to the changes in color values, during training the color twist is typically performed multiple times using different hue, saturation and brightness values such that a machine (e.g., processor) can correctly identify and detect an object for different hue, saturation and brightness values.

An input image to be processed is typically in a red, blue, green (RGB) color domain or a YUV domain, which includes a luminance component Y and two chrominance components, being a U component (blue projection) and V component (red projection), However, the hue, saturation and brightness values of the image cannot be changed in the RGB or YUV color domains. Accordingly, conventional color twist techniques convert the image from the RGB or YUV domain to the HSV domain to change the hue, saturation and brightness values and then convert the image back to the RGB domain for further processing.

That is, conventional color twist techniques execute a first read of the image to convert the image from the RGB or YUV domain to the HSV domain, load the HSV image, execute a second read in the HSV domain to change the hue, saturation and brightness values, store (e.g., in main memory or another portion of non-local memory) the output image with the changed values, load the output image (e.g., load the values of the image to registers from main memory), convert the image back to the RGB domain, and then execute additional reads of the image and additional load and store operations for further processing (e.g., change the brightness and contrast values of the image). However, performing multiples reads of the image, including multiple memory loads and stores, are time consuming and expensive (e.g., increased power consumption).

Conventional color twist techniques also include executing many branch instructions for various conditions (e.g., "if else" conditions and "switch case" conditions in a program). Execution of these branch instructions typically requires jumping between different portions of a program (e.g., updating a program counter value and pointing to another location of the program), thus deviating from the default order of instruction execution to perform comparisons and calculations for each condition, which consumes additional time and power. For branch instructions which are not loaded, a new value (of the branch instruction) must also be loaded to a register, which consumes yet additional time and power. In addition, computations (e.g., for intermediate values such as hue values) are typically processed parallel in an accelerated processor (e.g., GPU) in accordance with a single-instruction-multiple-data ("SIMD") paradigm. However, because execution of branch instructions requires jumping to different portions of a program, the different branch instructions are not executed in parallel with each other. Accordingly, another portion of a program, which depends on the data resulting from execution of the branch instructions, must wait for each branch instruction to finish executing, resulting in bottlenecking of a processing pipeline. Further, caching can be utilized to load concurrently load (e.g., from main memory) and store multiple instructions in cache memory. However, only contiguous memory slices can be concurrently loaded (e.g., from main memory) and stored in cache memory. Therefore, instructions must be executed in the order they are stored (i.e., default order) to gain this benefit of instruction caching. Because branching deviates from the default order of instruction execution, multiple instructions cannot be concurrently loaded and stored in the cache memory, nullifying such benefit of caching.

Features of the present disclosure include efficiently performing color twist operations for a plurality of images (e.g., a batch of images or tensors) by executing, for each input image (i.e., input frame), a single read of the image from system memory to convert the image from a first domain (e.g., RGB or YUV domain) to an HSV domain, adjust the hue and saturation values and convert the frame back to the first color domain. Each image is converted, during a first operation, from a first domain (e.g., an RGB domain or a YUV domain) to the HSV domain. A first set of intermediate values (e.g., pre-adjusted HSV values of the pixels) is determined during the conversion to the HSV domain and stored to a portion of local memory (e.g., register files 240, LDS memory 242, local cache memory or other locally shared memory). The first set of intermediate values stored in local memory are used to perform a second operation of adjusting the hue and saturation values in the HSV domain. A second set of intermediate values (e.g., the adjusted hue and saturation values of the pixels) are also stored to local memory and used to perform a third operation of converting from the HSV domain to the first domain (e.g., RGB domain or YUV domain). Because the intermediate values (i.e., first and second sets of intermediate values) are stored to local memory, the color twist (i.e., the three operations) is executed using a single read operation (e.g., a single load and store operation of the pixel values). That is, without performing multiple read operations used in conventional color twist techniques). Accordingly, execution time and power consumption is reduced and the overall performance is improved.

Features of the present disclosure also include efficiently performing color twist operations for a plurality of images by implementing masks to eliminate executing branch instructions for multiple conditions. That is, instead of executing branch instructions for different conditions (e.g., "if R is equal to Max"), different mask (i.e., a mask vector) are generated and used to compute correct values (e.g., R values, G values and B values) for the different conditions. Accordingly, the additional time and power consumed by branching instructions is avoided.

Features of the present disclosure provide devices and methods which convert a plurality of images, in parallel, from the first domain (e.g., an RGB domain or a YUV domain) to the HSV domain, adjust the hue, saturation and brightness values of the plurality of images in parallel in the HSV domain, and convert the plurality of images, in parallel, back from the HSV domain to the RGB domain.

Features of the present disclosure also include adjusting the hue and saturation values in the HSV color domain and adjusting the brightness and contrast values in the RGB color domain using the same single read of the image and without performing additional reads of the image.

A processing device for executing a color twist operation is provided which includes memory and a processor. The processor is configured to convert values of pixels of a frame from a first color domain to a hue, saturation and value (HSV) color domain, adjust hue values and saturation values of the pixels, store the adjusted hue and saturation values in a portion of the memory local to the processor; and convert the frame from the HSV color domain to the first color domain using the adjusted hue and saturation values stored in local memory.

A method for executing a color twist operation is provided which comprises converting values of pixels of a frame from a first color domain to a hue, saturation and value (HSV) color domain, adjusting hue values and saturation values of the pixels, storing the adjusted hue and saturation values in local memory and converting the frame from the HSV color domain to the first color domain using the adjusted hue and saturation values stored in local memory.

A processing device for executing a color twist operation on a plurality of frames is provided which comprises memory and a processor. The processor is configured to, for each of the plurality of frames, convert values of pixels from a first color domain to a hue, saturation and value (HSV) color domain, adjust hue values and saturation values of the pixels, store the adjusted hue and saturation values in a portion of the memory local to the processor and convert the frame from the HSV color domain to the first color domain using the adjusted hue and saturation values stored in local memory.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU or a stand-alone accelerator. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
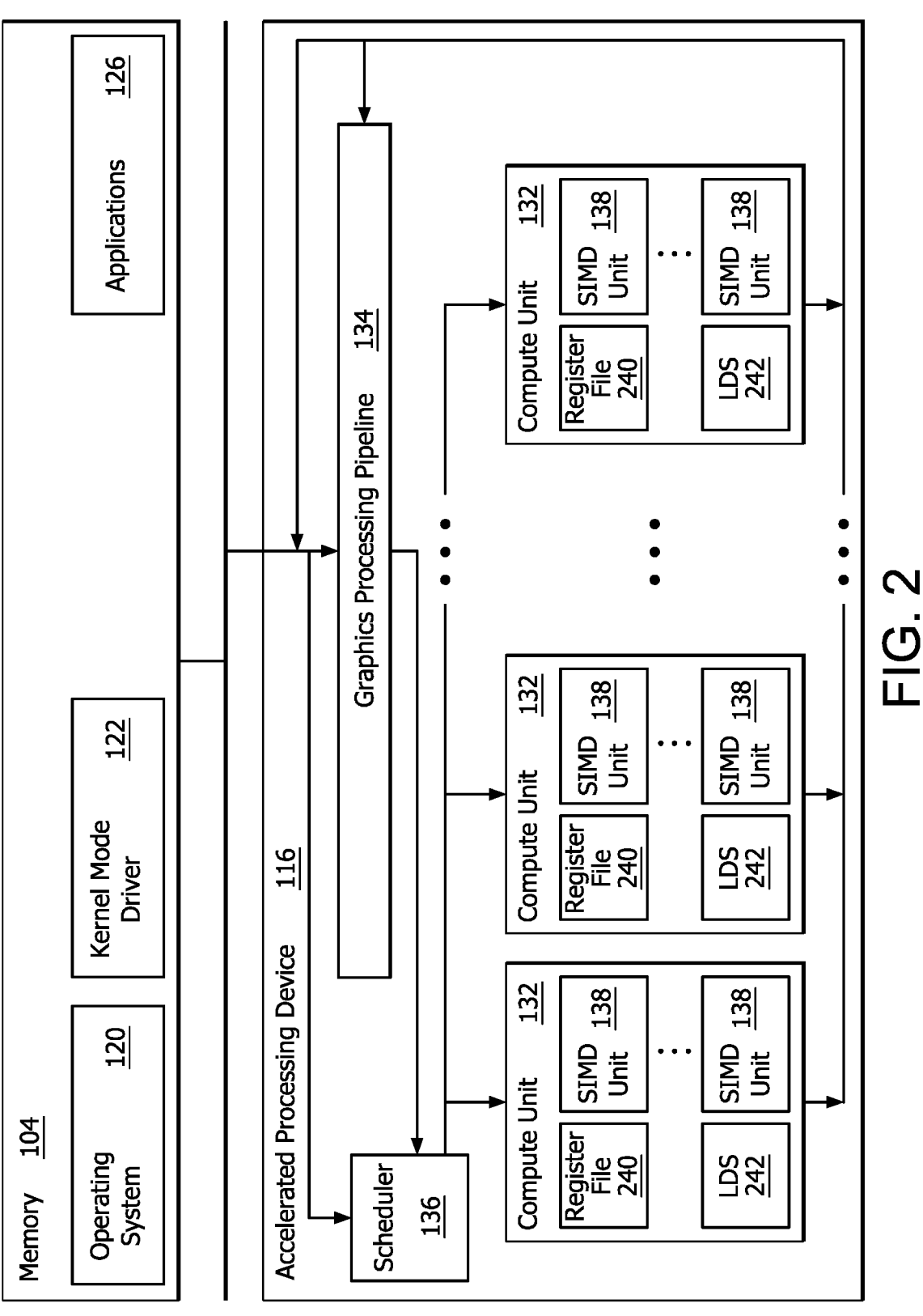
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The compute units 132 also different portions local memory, such as register files 240 and LDS memory 242. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116 is configured to execute a color twist operation using a single read of a frame by converting frames from a first color domain to an HSV color domain, storing preadjusted HSV values in local memory (e.g., register files 240, LDS memory 242, local cache memory (not shown) or another portion of locally shared memory, such as memory shared by SIMD units 138 of a compute unit 132), adjusting hue values and saturation values of pixels of the frame, storing the adjusted values in the local memory and converting the frame from the HSV color domain to the first color domain using the adjusted values in the local memory. The APD 116 is configured to convert the frames from the HSV color domain to the first color domain without loading intermediate values, such as the adjusted values from non-local memory.

The APD 116 is also configured to execute a color twist operation by determining intermediate values of a portion (e.g., tile) of a frame in parallel with one or more other portions (e.g. other tiles) of the frame. The APD 116 is also configured to execute a color twist operation on a frame in parallel with executing a color twist operation on a plurality of other frames.

The APD 116 is configured to convert the frame from the HSV color domain to the first color domain by calculating masked output values by applying a mask and a logic AND to predetermined intermediate values of the pixels; determining masked output values equal to zero to be invalid output values; and applying a logic OR on the masked output values to determine the RGB values.

As described above, conventional color twist techniques execute a first read of the image to convert the image from the RGB or YUV domain to the HSV domain (i.e., load and store values of the HSV image), execute a second read of the image in the HSV domain to change the hue, saturation and brightness values, store the output image with the changed values, load the output image, convert the image back to the RGB domain, and then execute additional reads of the image for further processing (e.g., change the brightness and contrast values of the image). However, performing multiples reads of the image, including multiple memory loads and stores, are time consuming and expensive (e.g., increased power consumption).

Converting an image from the RGB domain to the HSV domain typically includes normalizing input RGB values and determining, for each pixel, the maximum value and the minimum value by comparing the RGB values to each other. For example, for a particular pixel, if the R value=10, the G value=25 and the B value=100, the three values are compared to each other and 100 is determined as the maximum value of the pixel and 10 is determined as the minimum value of the pixel. Then, hue and saturation values are determined by comparing values based on the determined maximum and minimum values. For example, the hue and saturation values are determined as:

If (R=Max) and c≠0, then Hue=(G–B)/c
If (G=Max) and c≠0, then Hue=2+(B–R)/c
If (B=max) and c≠0, then Hue=4+(R–G)/c
If (c=0), then Hue=0
Saturation=c/v if (v≠0) else Saturation=0
Hue=Hue*360=> to convert to radians.
If (Hue>360), then Hue=Hue–360,
If (Hue<0), then Hue=Hue+360, where Max=the maximum value, c=the maximum value–the minimum value, and v=the brightness value.

Then, the hue values, saturation values and brightness values are set (e.g., change) to the values determined by the calculations described above. Accordingly, as shown in the example described above, conventional conversion from the RGB domain to the HSV domain includes executing multiple branch instructions for various conditions (e.g., "if then" conditions), which requires jumping between different portions of a program (e.g., updating a program counter value and pointing to another location of the program), thus deviating from the default order of instruction execution to perform many comparisons and calculations (e.g., calculations for several conditions to determine the maximum value and the minimum value of each pixel and to avoid division by 0 and calculations to determine the ranges for the hue and saturation values), for each condition, which consumes time and power to execute. For example, for the R, G and B values in the example above, conventional color twist techniques execute multiple branch instructions for each of the conditions shown above "If (R=Max)" and "If (R=Max) then Hue=(G–B)/c instructions typically requires jumping between different portions of a program (e.g., updating a program counter value and pointing to another location of the program), thus deviating from the default order of instruction execution to perform comparisons and calculations for each condition, which consumes additional time and power.

The conversion from the RGB domain to the HSV domain is performed by processing sets of pixels in parallel. For example, if a set of 8 pixels are processed in parallel, the values (e.g., RGB values) of each pixel are loaded to a register of a compute unit and the conversion is performed by processing (e.g., comparing the RGB values of each pixel to each other) and determining the maximum value and the minimum value each pixel in a SIMD unit of a compute unit.

Then, the image is converted back from the HSV domain to the RGB domain for further processing. Converting the image back from the RGB domain to the HSV domain typically also includes many comparisons. For example, the RGB values are determined from the hue, saturation and brightness values as:

Hi=H–Trunc(H);
Hf=H–Hi
Vsat=v*sat
Vsat hf=vsat*hf
Calculate p, q, v, t, p=v–Vsat, q=v–Vsatf, t=p+Vsatf switch (Hi){
  case 0: R=v; G=t; B=p; break;
  case 1: R=q; G=v; B=p; break;
  case 2: R=p; G=v; B=t; break;
  case 3: R=p; G=q; B=v; break;
  case 4: R=t; G=p; B=v; break;
  case 5: R=v; G=p; B=q; break;}
Brightness Adjustment (Ro,Go,Bo)=(R,G,B)*Alpha+ Beta,
where H is the adjusted hue value and Hi is the integer part of the hue value.

Accordingly, as shown in the example described above, conventional conversion from the HSV domain to the RGB domain also includes executing multiple branch instructions for various conditions (e.g. cases), each of which includes comparisons and calculations that consume additional time and power to execute.

Features of the present disclosure provide devices and methods for efficiently performing a color twist for a plurality of images (e.g., a batch of images or tensors), by executing, for each input image (i.e., input frame), a single read of the image (i.e., without performing multiple reads from the system memory). Each of the images are converted, during a first operation, from a first domain (e.g., an RGB domain or a YUV domain) to the HSV domain. A first set of intermediate values (e.g., pre-adjusted HSV values of the pixels) determined during the conversion are stored to local memory (e.g., register files 240, LDS memory 242, local cache memory or other locally shared memory) and used to perform a second operation of adjusting the hue and saturation values in the HSV domain. A second set of intermediate values (e.g., the adjusted hue and saturation values of the pixels) are also stored to local memory and used to perform a third operation of converting from the HSV domain to the first domain (e.g., RGB domain or YUV domain). Because the intermediate values (i.e., first and second sets of intermediate values) are stored to a portion of local memory, the color twist (i.e., the three operations) is executed using a single load and store operation of the pixel values (i.e., without performing multiple load and store operations used in conventional color twist techniques).

Features of the present disclosure also include efficiently performing color twist operations for a plurality of images by implementing masks to eliminate executing branch instructions for multiple conditions. That is, instead of executing branch instructions to compute values (e.g., R values, G values, B values, hue values and saturation values) for different conditions (e.g., "if R is equal to Max"), masks (i.e., a mask vectors) are generated and used to compute the values for the different conditions. Accordingly, the additional execution time and power consumption by branching instructions is avoided and the overall performance is improved.

Figure 3:
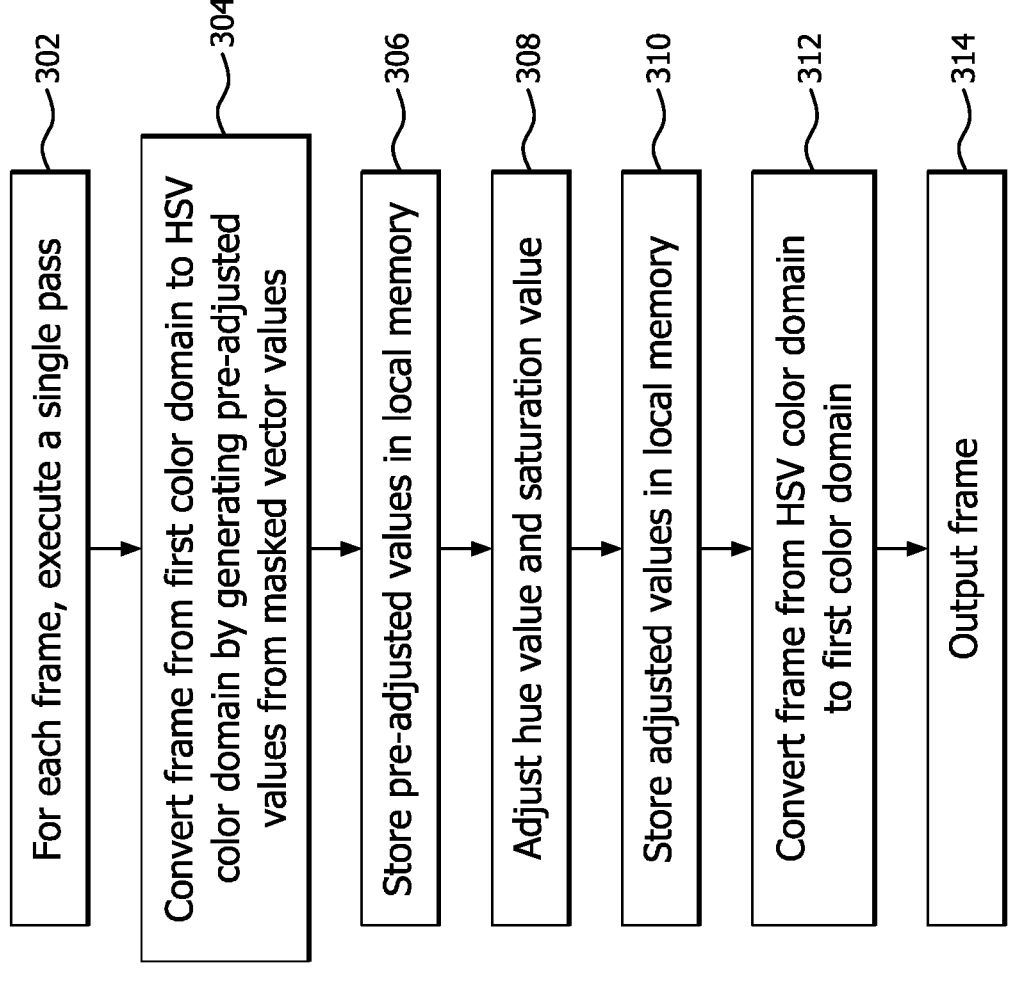
FIG. 3 is a flow diagram illustrating an example method of executing a color twist operation according to features of the present disclosure.

FIG. 3 is a flow diagram illustrating an example method 300 of executing a color twist operation according to features of the present disclosure. For simplified explanation, the method 300 is described with reference to executing a color twist for a single frame of a plurality of frames (e.g., batch of frames).

Features of the present application are implemented, however, to execute a color twist operation to each of a plurality of frames (i.e., images). In addition color twist operations are performed on the plurality of frames in parallel.

Figure 4:
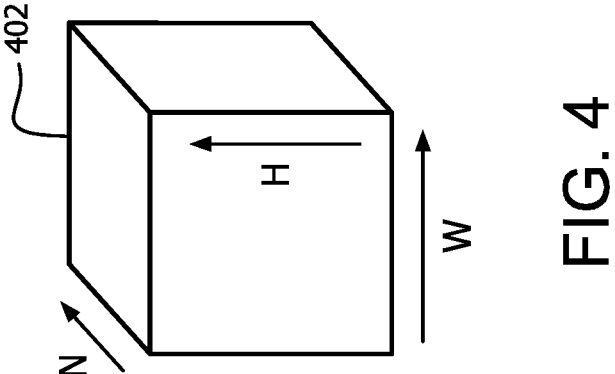
FIG. 4 illustrates example dimensions of a plurality of images to which a color twist operation is performed according to features of the present disclosure.

For example, FIG. 4 illustrates example dimensions of a plurality of images (i.e., frames) to which a color twist operation is performed according to features of the present disclosure.

The box 402 shown in FIG. 4 represents a batch of N number of images (frames), with each image having a number of pixels in height (11) and a number of pixels in width (W), such as an image or a portion (e.g., a tile) of an image. The images can be processed in NHWC format or NCHW format, where C is the number of channels (e.g., 3 channels each representing one of the R component, the G and the B component).

In addition, instead of processing N number of images at each parallel processor (e.g., compute unit, core or SIMD unit), if the number of images N to be processed is less than the available number of parallel processors, an image can be dynamically divided (e.g., by height (H) or width (W) or by channel (C)) such that each divided portion of the image is processed in parallel by a different processor.

Referring back to FIG. 3, as shown at block 302, the method 300 includes executing a single read of a frame (i.e., image).

The operations performed at blocks 304, 306 and 308 are then executed using a single read of the frame (i.e., image) of pixel values (i.e., without performing multiple reads used in conventional color twist techniques).

Figure 5:
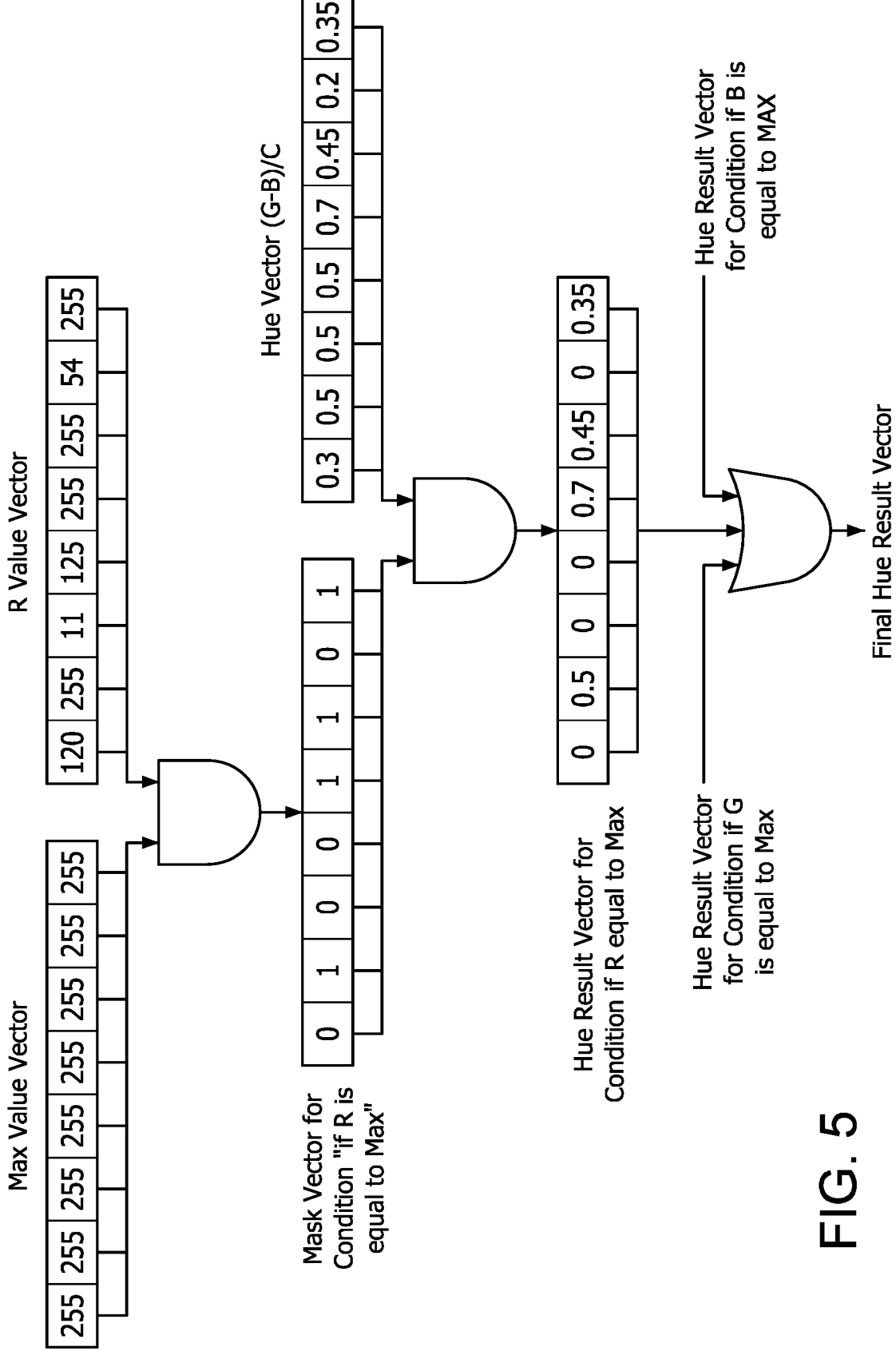
FIG. 5 is a diagram illustrating an example of using masks to compute hue values for conversion of a frame from an RGB domain to an HSV domain according to features of the present disclosure.

As shown at block 304, the method 300 includes converting a frame (i.e., image) from a first domain (e.g., an RGB domain or a YUV domain) to the HSV domain. FIG. 5 is a diagram illustrating an example of using masks to compute hue values (e.g., intermediate hue values) for converting a frame from an RGB domain to an HSV domain according to features of the present disclosure.

The number of values (i.e., vector sizes) and types of values shown in FIG. 5 are merely examples. Features of the present disclosure can be implemented for any number of values (i.e., any vector size) and different types of values (e.g., saturation values, brightness values and any other values used to convert a frame between a first domain (e.g., an RGB domain or a YUV domain) and an HSV domain to execute a color twist operation. The conditions (e.g., "if R is equal to Max", "if G is equal to Max" and "if B is equal to Max") shown in FIG. 5 are also examples. Features of the present disclosure include generating masks (and avoid branching instructions) for any types of conditions.

The example shown in FIG. 5 generates masked values and hue values (in contrast to executing conventional branching instructions) for the conditions described above. That is, the example shown in FIG. 5 generates masked values and hue values (in contrast to executing conventional branching instructions) for the conditions "if R=Max and c≠0, then Hue=(G–B)/c," "if G=Max and c≠0, then Hue=2+ (B–R)/" and "if (B=max) and c≠0, then Hue=4+(R–G)/c."

For simplification purposes, FIG. 5 illustrates the use of masked vector values and logic gates, in detail, to determine pre-adjusted hue values (e.g., intermediate values) for the condition "if R is equal to Max." Masked vector values and logic gates are used in a similar manner to determine the pre-adjusted hue values for the conditions "if G is equal to max" and "if B is equal to max" (but for "if G is equal to Max, then compute Hue as (2+(B–R)/c) and for "if B is equal to Max, then compute Hue as ((4+(R–G)/c)") Accordingly, the details of determining the pre-adjusted hue values (e.g., intermediate values) for the conditions "if G is equal to max" and "if B is equal to max" are omitted to avoid superfluous description.

As shown in FIG. 5, masked vector values (e.g., 8 values) are generated from maximum vector values and the R color vector values. That is the masked vector values (Mask Vector for Condition "if R is equal to Max) are output from a logic AND gate (top logic AND gate shown in FIG. 5) generated from maximum vector values (Max Value Vector) and the R values of the pixels (R Value Vector) input to the logic AND gate. For example, because the first R value (120) of the R Value Vector is not equal to the max value 255, the output is False (e.g., "0" value). Because the second R value (255) of the R Value Vector is equal to the max value 255, the output is True (e.g., "1" value). That is, the masked values are a vector output of a logical operation of at least 2 vectors (in this example, the Max Value Vector and the R Value Vector).

Then, as shown in FIG. 5, hue vector values are generated from the masked vector values and hue vector values computed from (G–B)/C (Hue Vector (G–B)/C). That is the hue vector values (Hue Result Vector for Condition if R is equal to Max) are output from a logic AND gate (bottom logic AND gate shown in FIG. 5) generated the masked vector values and the hue vector values input to the logic AND gate. The masked vector "0" values are determined to be invalid values. For example, because the first masked vector value is a "0" value (False), the first hue vector value is also a "0" value. However, because the second masked vector value is a "0" value (True), the second hue vector value computed from (G–B)/C is output as the second hue vector value. The hue vector values for the conditions "if R is equal to Max," "if B is equal to Max" and "if G is equal to Max" are then output from the logic OR gate as final hue vector values.

As shown at block 306, the method 300 includes storing pre-adjusted intermediate values (e.g., pre-adjusted HSV values), which are determined, for example as described above at block 304, during the conversion via the single read of the image. The pre-adjusted intermediate values are stored to local memory (e.g., register files, LDS memory or local cache memory) to be used to perform a second operation of adjusting the hue and saturation values in the HSV domain.

As shown at block 308, the method 300 includes adjusting the hue and saturation values of the frame in the HSV domain. Because the pre-adjusted HSV values are stored in local memory, the hue and saturation values are adjusted at block 306 using the same single read of the frame used to convert the frame from the RGB domain to the HSV domain.

In addition, because the pre-adjusted values are stored in the local memory, the adjusted hue and saturation values are determined without executing additional load and store operations. The hue and saturation values are adjusted, for example, using the pseudo-code shown below.

```
Hue = Hue + Hue_adjustment    //(Hue Adjustment)
If (Hue >= 6) Hue -= 6; if (Hue <0) Hue += 6; // Hue has to be
between 0-6
  Sat *= Sat_adjustment          //(Saturation Adjustment)
  Sat = max(0, min(1, Sat))      // Saturation has to be between 0 and 1
```

-continued

| | |
|---|---|
| V *= Value_adjustment | // Value adjustment |
| V = max(0, min(1, V)) | // Value has to be between 0 and 1 |
| Brightness Adjustment (Ro,Go,Bo) = (R,G,B)*Alpha + Beta, | |
| where Alpha and Beta are brightness adjustment parameters. | |

As shown at block 310, the adjusted hue and saturation values of each image are stored to local memory and used to perform a third operation of converting the images from the HSV domain to the RGB domain. For example, the adjusted hue and saturation values are stored to local register files, LDS memory, or local cache memory.

As shown at block 312, the method 300 includes converting the plurality of images in parallel back from the HSV domain to the RGB domain. Because the adjusted values are stored, at block 310, to local memory, conversion back to the first color domain is also executed using the same single read of the image without performing an additional load and store operation. Accordingly, execution time and power consumption is reduced and the overall performance is improved.

The image is then output, at block 314. For example the pixel values of each image is stored to main memory and provided for display to a display device.

That is, as shown above, a color twist of an image is efficiently executed by using vector masks (e.g., 256 bit vector masks) to avoid executing branch instructions for various conditions (e.g., "if else," if then" and switch case" conditions), used in conventional color twist techniques, resulting in reduced time and power consumption. For example, the conditional statements are avoided by using 2 vector minimum value instructions, 2 vector maximum value instructions, and 3 vector masks for each of the comparisons of the RGB values used to determine the maximum value (e.g., instead of Max=max(R,G,B) and Min=min(R,G,B)). The division by zero calculations are avoided by using masks for (c!=0) and (v !=0). Then Then the correct hue value is determined by applying a logical AND instruction with the masks and summing the vector RGB registers.

In another example, in contrast to executing branch instructions for a switch statement with 6 branches to compute the RGB values from the HSV values, nested sequences (e.g., 3 sequences) are used to process the images. The highest parallelism occurs in the innermost loop, in which each pixel (e.g., pixels in a row of an image) in which more than 70% of the computation occurs.

Because a single read is used and intermediate values (e.g., adjusted HSV values) are stored in local memory (e.g., in the local data store (LDS) or register file of the compute unit) and then read from the local memory when converting between the RGB domain and the HSV domain, which reduces the memory footprint.

In addition, after adjusting the hue value, the hue value range is checked a single time to avoid additional conditional checks and other conditional statements are avoided by using logical AND with vector masks, as described above with regard to FIG. 5. A vector addition and subtraction is performed to adjust the range of the result.

Also, the brightness and contrast values of the pixels are adjusted in the RGB domain by a single vector FMA instruction, avoiding addition and multiplication calculations. In contrast to conventional techniques which adjust the brightness value in the HSV domain, the brightness value is adjusted in the RGB domain after conversion from the HSV domain to the RGB domain.

Further, by incorporating fixed-point integer computations, this can further be used for faster integer instructions. Algorithms can be extended to FP16 (16-bit floating-point arithmetic), BFLOAT16, or other floating-point representations to increase throughput.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, and SIMD units 138 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device for executing a color twist operation comprising:

memory; and a processor configured to:

convert values of pixels of a frame from a first color domain to a hue, saturation and value (HSV) color domain;

apply the color twist by rotating a hue component by a twist angle $\Delta$ and adjusting a saturation component according to a factor $\beta$ for the pixels in the HSV color domain;

store the adjusted hue and saturation values in a portion of the memory local to the processor; and convert the frame from the HSV color domain to the first color domain using the adjusted hue and saturation values stored in the portion of the memory.

2. The processing device of claim 1, wherein the portion of the memory local to the processor is one of register files, local data store (LDS) memory and local cache memory.

3. The processing device of claim 1, wherein the first color domain is one of a red, green, blue (RGB) color domain and a Y component, U component, V component (YUV) color domain; and the processor is configured to convert the frame from the HSV color domain to one of the RGB color domain and the YUV color domain using the adjusted hue and saturation values stored in local memory.

4. The processing device of claim 1, further comprising a display device, wherein the processor is further configured to store pixel values of an output frame and provide the pixel values of the output frame to the display device for display.

5. A method of executing a color twist operation comprising:

converting values of pixels of a frame from a first color domain to a hue, saturation and value (HSV) color domain;

applying the color twist by rotating a hue component by a twist angle $\Delta$ and adjusting a saturation component according to a factor $\beta$ for the pixels in the HSV color domain;

storing the adjusted hue and saturation values in local memory; and converting the frame from the HSV color domain to the first color domain using the adjusted hue and saturation values stored in the local memory.

6. The method of claim 5, wherein the local memory is one of register files, local data store (LDS) memory and local cache memory.

7. The method of claim 5, wherein the first color domain is one of a red, green, blue (RGB) color domain and a Y component, U component, V component (YUV) color domain; and the method further comprises converting the frame from the HSV color domain to one of the RGB color domain and the YUV color domain using the adjusted hue and saturation values stored in local memory.

8. The method of claim 5, further comprising converting the frame from the HSV color domain to the first color domain by, for each of a plurality of red, green and blue (RGB) color vector values:

generating, masked vector values from maximum vector values and corresponding RGB color vector values;

determining masked vector values equal to zero to be invalid output values;

generating hue and saturation vector values from the masked vector values and the corresponding RGB color vector values; and generating, as pre-adjusted hue and saturation vector values, the hue and saturation vector values generated from the masked vector values and the corresponding RGB color vector values.

9. The method of claim 5, further comprising converting the frame from the HSV color domain to the first color domain without loading the adjusted hue and saturation values from non-local memory.

10. The method of claim 5, further comprising adjusting brightness values and contrast values in the first color domain after converting from the HSV domain to the first color domain.

11. The method of claim 5, further comprising:

storing pre-adjusted pixel values in local memory resulting from converting from the first color domain to the HSV color domain; and adjusting hue values and saturation values of the pixels based on the pre-adjusted pixel values.

12. The method of claim 5, further comprising storing pixel values of an output frame and providing the pixel values of the output frame for display.

13. A processing device for executing a color twist operation on a plurality of frames comprising:

memory; and a processor configured to, for each of the plurality of frames:

convert values of pixels from a first color domain to a hue, saturation and value (HSV) color domain;

apply the color twist by rotating a hue component by a twist angle $\Delta$ and adjusting a saturation component according to a factor $\beta$ for the pixels in the HSV color domain;

store the adjusted hue and saturation values in a portion of the memory local to the processor; and convert the frame from the HSV color domain to the first color domain using the adjusted hue and saturation values stored in the portion of the memory.

14. The processing device of claim 13, wherein the plurality of frames is a batch of N number of frames, with each frame having a number of pixels in height (H) and a number of pixels in width (W); and the frames are processed in one of NHWC format and NCHW format, where C is a number of channels.

15. The processing device of claim 14, wherein when the N number of frames to be processed is less than a number of parallel processors available to process the N number of frames, the processing device is configured to dynamically divide the frames by one of the height H, the width W and the number of channels C such that each divided portion of the frame is processed in parallel.

16. The processing device of claim 13, wherein the portion of the memory is one of register files, local data store (LDS) memory and local cache memory.

17. The processing device of claim 13, wherein the processor is configured to convert the frame from the first color domain to the HSV color domain by, for each of a plurality of red, green and blue (RGB) color vector values:

generating, masked vector values from maximum vector values and corresponding RGB color vector values;

determining masked vector values equal to zero to be invalid output values;

generating hue and saturation vector values from the masked vector values and the corresponding RGB color vector values; and generating, as pre-adjusted hue and saturation vector values, the hue and saturation vector values generated from the masked vector values and the corresponding RGB color vector values.

18. The processing device of claim 1, wherein the rotating and the adjusting are performed in a branch-free single-pass vector operation that loads vectors of HSV triplets and writes adjusted HSV values back.

19. The processing device of claim 18, wherein the branch-free single-pass vector operation reads and writes HSV triplets in coalesced bursts.

20. The processing device of claim 1, wherein $\Delta$ and $\beta$ are provided as parameters that vary per frame, per region, or per pixel.

21. The processing device of claim 1, wherein adjusting the saturation component according to the parameter $\beta$ comprises scaling the saturation component by a factor $\beta$.

* * * * *